United States Patent [19]

Petit

[11] 3,985,721

[45] Oct. 12, 1976

[54] PROCESS FOR TERMINATING THE POLYMERISATION OF VINYL CHLORIDE IN AQUEOUS DISPERSION

[75] Inventor: André Petit, Brussels, Belgium

[73] Assignee: Solvay & Cie, Brussels, Belgium

[22] Filed: Aug. 26, 1975

[21] Appl. No.: 607,958

[30] Foreign Application Priority Data

Oct. 18, 1974 France .............................. 74.35507

[52] U.S. Cl. ................................................ 526/84
[51] Int. Cl.$^2$ ...................... C08F 2/42; C08F 14/06
[58] Field of Search ......... 260/92.8 W, 87.1, 87.5 C

[56] References Cited

UNITED STATES PATENTS

| | | | |
|---|---|---|---|
| 2,616,882 | 11/1952 | Seymour | 260/87.1 |
| 3,222,334 | 12/1965 | Demme | 260/92.8 W |

*Primary Examiner*—Alan Holler
*Attorney, Agent, or Firm*—Spencer & Kaye

[57] ABSTRACT

The polymerisation of vinyl chloride in aqueous dispersion is terminated by introducing 8-hydroxyquinoline into the aqueous dispersion. The preferred amount to use is 0.025 to 0.2 % by weight of the vinyl chloride employed.

8 Claims, No Drawings

PROCESS FOR TERMINATING THE POLYMERISATION OF VINYL CHLORIDE IN AQUEOUS DISPERSION

The present invention relates to a process for terminating the polymerisation of vinyl chloride in aqueous dispersion.

Polymerisation in aqueous dispersion is currently the polymerisation technique most widely used for the production of vinyl chloride polymers. Because of its exothermic nature precautions must be taken to keep the reaction effectively under control. In particular provision must be made for adequate stirring and cooling of the polymerisation medium.

An unforeseen defect in one or more of the control means during polymerisation leads to a runaway reaction which, due to the resulting uncontrollable increase in the temperature of the reaction medium, results at best in degradation of the polymer. If the runaway polymerisation cannot be rapidly brought under control, far more serious trouble may result such as rupture of the bursting disc on the autoclave and the loss of monomer and even polymer.

For reasons of safety and economy it is essential for effective means to be available for rapidly terminating the polymerisation of vinyl chloride in aqueous dispersion should the need arise.

It is known to add various types of polymerisation inhibitor to vinyl chloride monomer to prevent premature polymerisation. The use of antioxidants has already been recommended, as for instance those disclosed in Belgian Pat. No. 632,901 of May 28, 1973 to the Rohm & Haas Co., ie phenol, hydroquinone, para-tertiary butyl catechol etc.

However, the phenolic compounds used for inhibiting the premature polymerisation of vinyl chloride monomer in the homogeneous phase have proved to be insufficiently active for the effective and rapid termination of the polymerisation of vinyl chloride in aqueous dispersion. Moreover, the use of these compounds usually affects the colour of the resin.

The Applicants have now found that it is possible to terminate the polymerisation of vinyl chloride in aqueous dispersion by adding a special phenolic compound to the aqueous medium without an appreciable deterioration in the colour of the vinyl chloride polymers.

The present invention relates to a process for terminating the polymerisation of vinyl chloride in aqueous dispersion in which 8-hydroxyquinoline is introduced into the aqueous dispersion.

The Applicants have found that 8-hydroxyquinoline is a particularly effective agent for terminating the polymerisation of vinyl chloride in aqueous dispersion and can be used throughout the polymerisation cycle, ie both at low and high conversions.

Consequently 8-hydroxyquinoline is suitable for terminating polymerisation while the content of vinyl chloride monomer in the autoclave is still high and there is a major risk of explosion in the case of a runaway reaction, or for terminating polymerisation under normal operating conditions when the desired degree of conversion has been reached.

The amount of 8-hydroxyquinoline to be introduced into the aqueous polymerisation medium to terminate polymerisation is not particularly critical. To some extent the amount is linked to the polymerisation temperature and to the extent to which polymerisation has advanced when the 8-hydroxyquinoline is introduced.

In practice as little as 0.01% by weight of 8-hydroxyquinoline calculated on the amount of vinyl chloride originally used is sufficient to block polymerisation within an acceptable time.

It is obvious however that the introduction of larger amounts of 8-hydroxyquinoline will enable the polymerisation to be terminated even more quickly. However, to avoid unnecessary contamination of the polymer and the autoclave, which requires more intensive cleaning before each polymerisation cycle as the amount of 8-hydroxyquinoline increases, it is advisable not to exceed 8-hydroxyquinoline contents of the order of 0.5% by weight. The preferred amount to use is 0.025 to 0.2% by weight of 8-hydroxyquinoline calculated on the amount of vinyl chloride originally used.

Any method of introducing the 8-hydroxyquinoline can be used: it may be introduced all at once or in stages, in the solid state or dissolved in an organic solvent.

According to a preferred embodiment of the process of the present invention the 8-hydroxyquinoline is introduced as a solution in an organic solvent. In practice all solvents for 8-hydroxyquinoline that are less volatile than vinyl chloride and will not impair the properties of the polymer are suitable. Dichloromethane, trichloromethane, methyl alcohol or mixtures thereof and preferably chloroform may be used to advantage.

The process forming the object of the present invention can be applied equally well to polymerisation in aqueous suspension and to polymerisation in aqueous emulsion in the presence of the conventional ingredients employed in these types of polymerisation, ie dispersing or emulsifying agents and oil-or water-soluble catalysts, together if desired with various additives introduced at any state of polymerisation such as stabilisers, plasticisers, colourants, reinforcing agents or processing aids.

By the polymerisation of vinyl chloride we mean the homopolymerisation of vinyl chloride and the copolymerisation of a mixture of monomers containing a preponderance and preferably more than 80% of vinyl chloride, as for example mixtures of vinyl chloride and vinyl acetate, propylene or ethylene.

The process of the present invention applies more particularly to terminating the polymerisation of vinyl chloride in aqueous emulsion, which is the most difficult to bring about.

The invention is illustrated but in no way limited by the following examples.

They relate to the polymerisation of vinyl chloride in aqueous emulsion where stirring stops during polymerisation and the temperature differential ($\Delta T$) between the autoclave temperature and the jacket temperature is measured at various intervals. This measurement makes it possible to calculate the effectiveness of inhibition.

EXAMPLE 1 (REFERENCE)

1200 g of distilled water, 10 g of sodium stearate and 0.3 g of ammonium persulphate are introduced at room temperature into a 3 liter autoclave provided with a stirrer and thermostatically controlled double jacket. The autoclave is closed and purged with nitrogen to remove the oxygen before introducing 800 g of vinyl chloride. The stirrer is started up and the medium heated to 50° C. The moment at which polymerisation starts is regarded as being the reaction time $t_o$.

At $t_o + 3$ hours stirring of the autoclave is stopped. At this point, $\Delta T = 1.5°$ C. A runaway reaction sets in, a fact that is manifested by an increase in the temperature $\Delta T$. 30 Minutes after stirring has ceased, the reaction medium reaches its maximum temperature which corresponds to a $\Delta T$ maximum of 20° C. $\Delta T$ then decreases slowly as all the vinyl chloride has reacted.

EXAMPLE 2

This example, whose general method of operation is the same as that of Example 1, relates to the introduction of 0.4 g of 8-hydroxyquinoline in a 4% chloroform solution when $\Delta T$ has reached 5° C due to breaking off stirring at $t_o + 3$ hours.

The temperature of the reaction medium still rises slightly and reaches its maximum which corresponds to a $\Delta T$ maximum of 5.4° C after 7 minutes.

As a result of the introduction of the 8-hydroxyquinoline the further increase of the temperature of the reaction medium is negligible and polymerisation ceases altogether after 7 minutes.

EXAMPLE 3

This example conforms to Example 2 in all respects except that the stirrer is stopped at $t_o + 1$ hours. The 8-hydroxyquinoline is injected when $\Delta T$ is 5° C and the maximum value for $\Delta T$ which is only 5.2° C is reached in 2 minutes.

Here again the increase in the temperature of the reaction medium has been greatly restricted and the reaction totally arrested in a very short time.

EXAMPLE 4

Example 4 conforms to Example 2 in all respects except that a 4% solution of 8-hydroxyquinoline in a 50:50 mixture of methyl alcohol and methylene chloride is used.

The results are similar to those of Example 2.

EXAMPLES, 5, 6, 7 (REFERENCE)

These examples, whose results should be compared with those of the examples according to the invention, were carried out by the method of Example 4 except that 0.4 g of a phenolic compound in the same solvent was introduced when $\Delta T$ was 5° C.

The results of these examples are given in the following table.

| Example No. | Phenolic compound | Maximum $\Delta T$, °C |
|---|---|---|
| 5 | Phenol | 18.1 |
| 6 | p-aminophenol | 12.8 |
| 7 | p-tertiary-butyl catechol | 9.6 |

I claim:
1. Process for terminating the polymerisation of vinyl chloride in aqueous dispersion, wherein 8-hydroxyquinoline is introduced into the aqueous dispersion.
2. Process as in claim 1, characterised in that the amount of 8-hydroxyquinoline introduced is at least 0.01% by weight of the vinyl chloride employed.
3. Process as in claim 1, characterised in that the amount of 8-hydroxyquinoline introduced does not exceed 0.5% by weight of the vinyl chloride employed.
4. Process as in claim 1, characterised in that the amount of 8-hydroxyquinoline introduced is between 0.025 and 0.2% by weight of the vinyl chloride employed.
5. Process as in claim 1, characterised in that the 8-hydroxyquinoline is used in the form of a solution in an organic solvent.
6. Process as in claim 5, characterised in that the organic solvent is selected from dichloromethane, trichloromethane, methyl alcohol and mixtures thereof.
7. Process as in claim 1, characterised in that it is used to terminate the polymerisation of vinyl chloride in aqueous emulsion.
8. Process as in claim 1, characterised in that it is used to terminate the polymerisation of vinyl chloride in aqueous suspension.

* * * * *